(12) United States Patent
Kobayashi et al.

(10) Patent No.: US 6,729,423 B2
(45) Date of Patent: *May 4, 2004

(54) HYBRID VEHICLE PROPULSION APPARATUS

(75) Inventors: Makoto Kobayashi, Tochigi-ken (JP); Taiji Maruyama, Utsunomiya (JP); Shigekazu Tanaka, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/259,659

(22) Filed: Sep. 30, 2002

(65) Prior Publication Data

US 2003/0024749 A1 Feb. 6, 2003

Related U.S. Application Data

(62) Division of application No. 09/150,102, filed on Sep. 9, 1998, now Pat. No. 6,481,517.

(30) Foreign Application Priority Data

Sep. 12, 1997 (JP) .............................. 9-249209
Sep. 12, 1997 (JP) .............................. 9-249219

(51) Int. Cl.[7] .................................................. B60K 1/00
(52) U.S. Cl. .................................... 180/65.3; 180/65.2
(58) Field of Search .......................... 180/65.1, 65.2, 180/65.3, 65.5, 65.6, 65.8, 300

(56) References Cited

U.S. PATENT DOCUMENTS

| | | | |
|---|---|---|---|
| 1,064,089 A | 6/1913 | Rayner | 180/65.2 |
| 1,207,732 A | 12/1916 | Entz | 180/65.2 |
| 1,350,424 A | 8/1920 | Schurch | 180/65.2 |
| 2,401,386 A | 6/1946 | Smellie | 172/36 |

(List continued on next page.)

FOREIGN PATENT DOCUMENTS

| | | | |
|---|---|---|---|
| DE | 32 27 810 A | 1/1984 | |
| DE | 3243513 A1 * | 5/1984 | ............ B60K/1/00 |
| DE | 37 37 192 A1 | 7/1988 | |
| DE | 196 29 346 A1 | 1/1998 | |
| EP | 0 791 495 A1 | 8/1997 | |
| JP | 56-110752 | 8/1981 | |
| JP | 59-139626 | 9/1984 | |
| JP | 60-58923 | 4/1985 | |
| JP | 5-42831 | 2/1993 | |
| JP | 5-42833 | 2/1993 | |
| JP | 05-024448 | 2/1993 | |
| JP | 5-168102 | 7/1993 | |
| JP | 5-176405 | 7/1993 | |
| JP | 9-156388 | 6/1997 | |

OTHER PUBLICATIONS

Copy of Japanese Patent Application Office Action for corresponding Japanese Patent Application No. 09–249209 with partial translation dated Oct. 30, 2001.

Copy of Japanese Patent Application Office Action for corresponding Japanese Patent Application No. 09–249219 with partial translation dated Oct. 30, 2001.

Primary Examiner—Brian L. Johnson
Assistant Examiner—Han Phan
(74) Attorney, Agent, or Firm—Armstrong, Kratz, Quintos, Hanson & Brooks, LLP

(57) ABSTRACT

A motor generator has a rotor directly coupled to a crankshaft and a stator disposed around the rotor. A shield plate is disposed between coils of the stator and an internal combustion engine. A first partition and a second partition are disposed between the coils and a flywheel positioned adjacent to a clutch mechanism.

4 Claims, 12 Drawing Sheets

U.S. PATENT DOCUMENTS

| | | |
|---|---|---|
| 2,428,236 A | 9/1947 | Maxwell .................... 171/252 |
| 2,649,048 A | 8/1953 | Pezzillo et al. .............. 103/87 |
| 2,649,049 A | 8/1953 | Pezzillo et al. .............. 103/87 |
| 2,741,990 A | 4/1956 | White ........................ 103/87 |
| 2,875,694 A | 3/1959 | Carter ........................ 103/87 |
| 2,931,307 A | 4/1960 | Smith ......................... 103/87 |
| 3,161,794 A | 12/1964 | Lindgren ................... 310/89 |
| 3,419,957 A | 1/1969 | Stone ......................... 29/576 |
| 3,732,616 A | 5/1973 | Masrrodonato et al. ..... 29/576 |
| 3,733,504 A | 5/1973 | Dennis ........................ 310/86 |
| 3,858,067 A | 12/1974 | Otto .......................... 310/42 |
| 3,923,115 A | 12/1975 | Helling ................... 180/65 A |
| 4,470,476 A | 9/1984 | Hunt ........................ 180/65.2 |
| 4,499,391 A | 2/1985 | Sakamoto ................. 310/89 |
| 4,908,347 A | 3/1990 | Denk ........................... 505/1 |
| 4,916,344 A | 4/1990 | Hammer et al. ........... 310/154 |
| 4,953,284 A | 9/1990 | Hammer et al. ............. 29/596 |
| 4,958,095 A | 9/1990 | Uchida et al. ................ 310/59 |
| 5,103,127 A | 4/1992 | Peter ......................... 310/113 |
| 5,482,512 A | 1/1996 | Stevenson ...................... 475/5 |
| 5,643,119 A | 7/1997 | Yamaguchi et al. ............. 475/5 |
| 5,704,440 A | 1/1998 | Urban et al. ............... 180/65.2 |
| 5,713,425 A | 2/1998 | Buschhaus et al. ......... 180/65.2 |
| 5,770,905 A | 6/1998 | Suzuki et al. ................. 310/85 |
| 5,773,904 A | 6/1998 | Schiebold et al. ............. 310/92 |
| 5,788,006 A | 8/1998 | Yamaguchi ................ 180/65.2 |
| 5,796,195 A | 8/1998 | Miyakawa ................ 310/68 B |
| 5,799,744 A | 9/1998 | Yamaguchi et al. ........ 180/65.2 |
| 5,935,035 A | 8/1999 | Schmidt ........................ 475/5 |
| 5,942,827 A | 8/1999 | Neumann et al. ........... 310/154 |
| 5,947,855 A | 9/1999 | Weiss ............................ 475/5 |
| 6,481,517 B1 * | 11/2002 | Kobayashi et al. ......... 180/65.3 |

* cited by examiner

F I G. 2
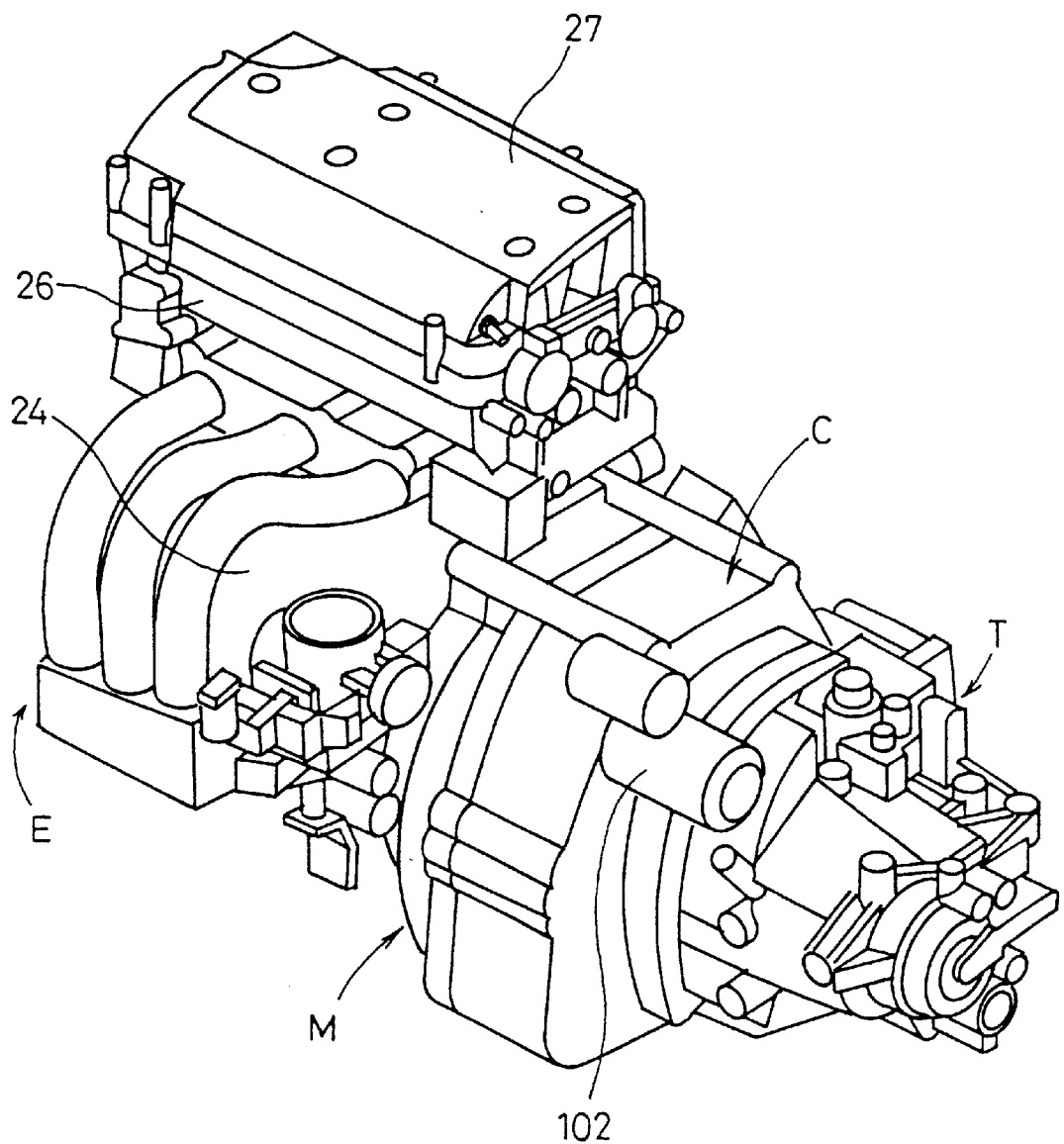

HYBRID VEHICLE PROPULSION APPARATUS

This application is a division of prior application Ser. No. 09/150,102 filed Sep. 9, 1998 now U.S. Pat. No. 6,481,517, which issued on Nov. 19, 2002.

BACKGROUND OF THE INVENTION

1. Field of the Invention

The present invention relates to a hybrid vehicle propulsion apparatus comprising an internal combustion engine having an output shaft and a motor generator coupled directly to the output shaft.

2. Description of the Related Art

There has been proposed a hybrid vehicle having an internal combustion engine for generating propulsive forces by combusting gasoline and a motor generator which can be operated as an electric generator for regenerating electric energy and an electric motor for generating propulsive forces with electric energy to assist propulsive forces produced by the internal combustion engine. The propulsive forces produced by the internal combustion engine and the electric motor are combined as required to propel the vehicle. For details, reference should be made to Japanese laid-open patent publication No. 9-156388.

A flywheel is usually connected to the crankshaft of the internal combustion engine for smoothing and stabilizing the rotation of the internal combustion engine. With the motor generator coupled to the crankshaft, since the rotation of a rotor, which is relatively heavy, of the motor generator tends to affect the rotation of the crankshaft, it is preferable to position the motor generator as closely to the crankshaft as possible. Positioning the motor generator as closely to the crankshaft as possible is effective to increase the rigidity of the motor generator.

However, the motor generator that is located closely to the internal combustion engine poses a problem in that leakage currents and leakage fluxes from coils of the motor generator influence the internal combustion engine which is made of metal, adversely affecting the rotation of the crankshaft.

On a manual-transmission hybrid vehicle, it is necessary to position a clutch mechanism between the internal combustion engine and the transmission or between the motor generator and the transmission. If the clutch mechanism is disposed closely to the motor generator, then metal particles produced by the clutch mechanism may be liable to enter the motor generator, adversely affect propulsive forces generated by the motor generator. Specifically, if metal particles contained in an abrasive powder produced when the friction plates of the clutch mechanism are engaged and disengaged are attracted to the magnets of the motor generator, then the metal particles are magnetized and generates magnetic fields, which then adversely affect the electromotive forces or propulsive forces that are generated. If the metal particles enter between the rotor and stator of the motor generator, then they are apt to increase the resistance to the rotation of the rotor, thereby adversely affecting the propulsive forces that are generated.

SUMMARY OF THE INVENTION

It is a general object of the present invention to provide a hybrid vehicle propulsion apparatus which has a motor generator disposed closely to an internal combustion engine for allowing a crankshaft to rotate in good conditions and preventing the internal combustion engine from being adversely affected by leakage currents and leakage fluxes from coils of the motor generator.

A major object of the present invention is to provide a hybrid vehicle propulsion apparatus which is effective to prevent an internal combustion engine from being adversely affected by leakage currents and leakage fluxes from coils of a motor generator, and which is relatively compact.

Another object of the present invention is to provide a hybrid vehicle propulsion apparatus which is effective to prevent leakage currents and leakage fluxes from coils of a motor generator from adversely affecting a flywheel, a clutch mechanism, a transmission, etc., and which is relatively compact.

Still another object of the present invention is to provide a hybrid vehicle propulsion apparatus which is free of adverse effects due to leakage currents and leakage fluxes from coils of a motor generator, and which is of relatively high rigidity.

Yet still another object of the present invention is to provide a hybrid vehicle propulsion apparatus which prevents metal particles contained in an abrasive powder produced by a clutch mechanism from entering a motor generator for thereby maintaining a desired level of performance of a motor generator.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2 is a perspective view of the hybrid vehicle propulsion apparatus;

DETAILED DESCRIPTION OF THE PREFERRED EMBODIMENTS

Figure 1:
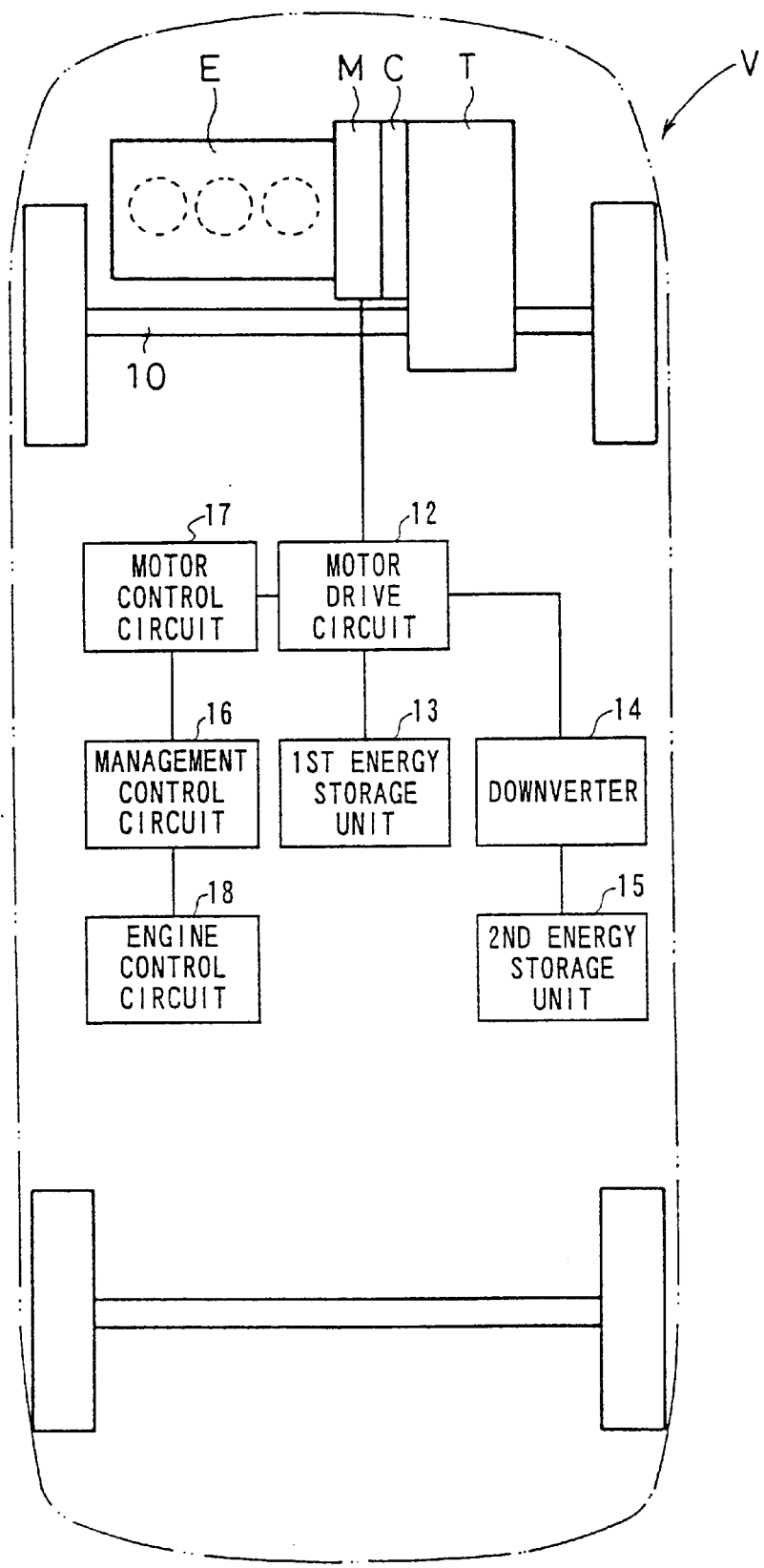
FIG. 1 is a schematic plan view, partly in block form, of a hybrid vehicle which incorporates a hybrid vehicle propulsion apparatus according to an embodiment of the present invention.

FIG. 1 schematically shows in plan a hybrid vehicle V which incorporates a hybrid vehicle propulsion apparatus according to an embodiment of the present invention.

As shown in FIG. 1, the hybrid vehicle V has an internal combustion engine E for generating propulsive forces by combusting gasoline, a motor generator M which can be operated as an electric generator for regenerating electric energy and an electric motor for generating propulsive forces with electric energy to assist propulsive forces produced by the internal combustion engine E, a clutch mechanism C, and also to a transmission T for selecting and transmitting the propulsive forces to a drive axle 10.

The motor generator M is controlled by a motor drive circuit 12 which is connected to a first energy storage unit 13 comprising a capacitor, for example, for supplying and storing high-voltage electric energy, and a downverter 14 that is connected to a second energy storage unit 15 for storing electric energy. The hybrid vehicle V also has a management control circuit 16 connected to a motor control circuit 17 for controlling the motor generator M through the motor drive circuit 12, and also to an engine control circuit 18 for controlling the internal combustion engine E.

The internal combustion engine E, the motor generator M, the clutch mechanism C, and the transmission T will be described below.

Figure 3:
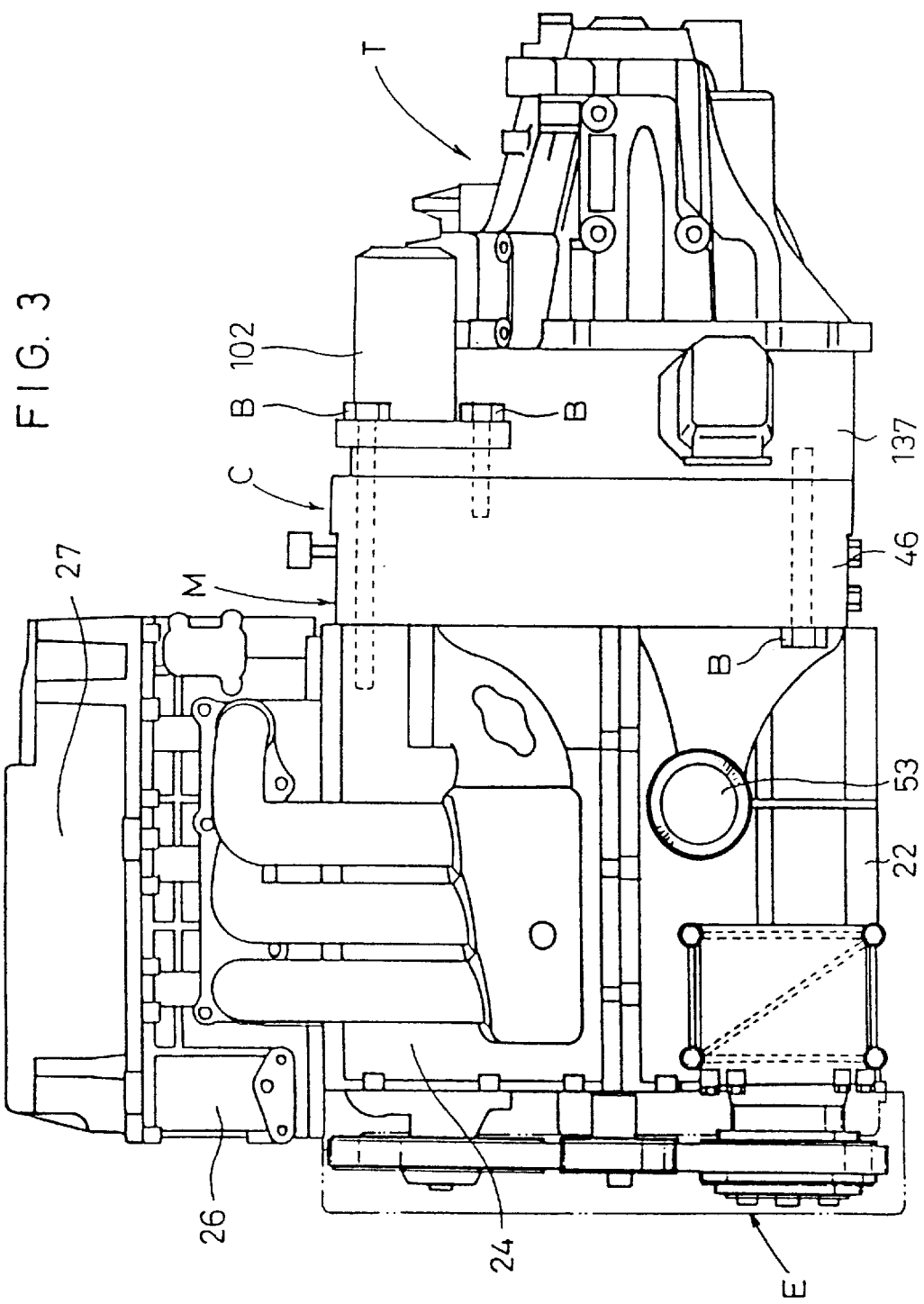
FIG. 3 is a side elevational view of the hybrid vehicle propulsion apparatus.
Figure 4:
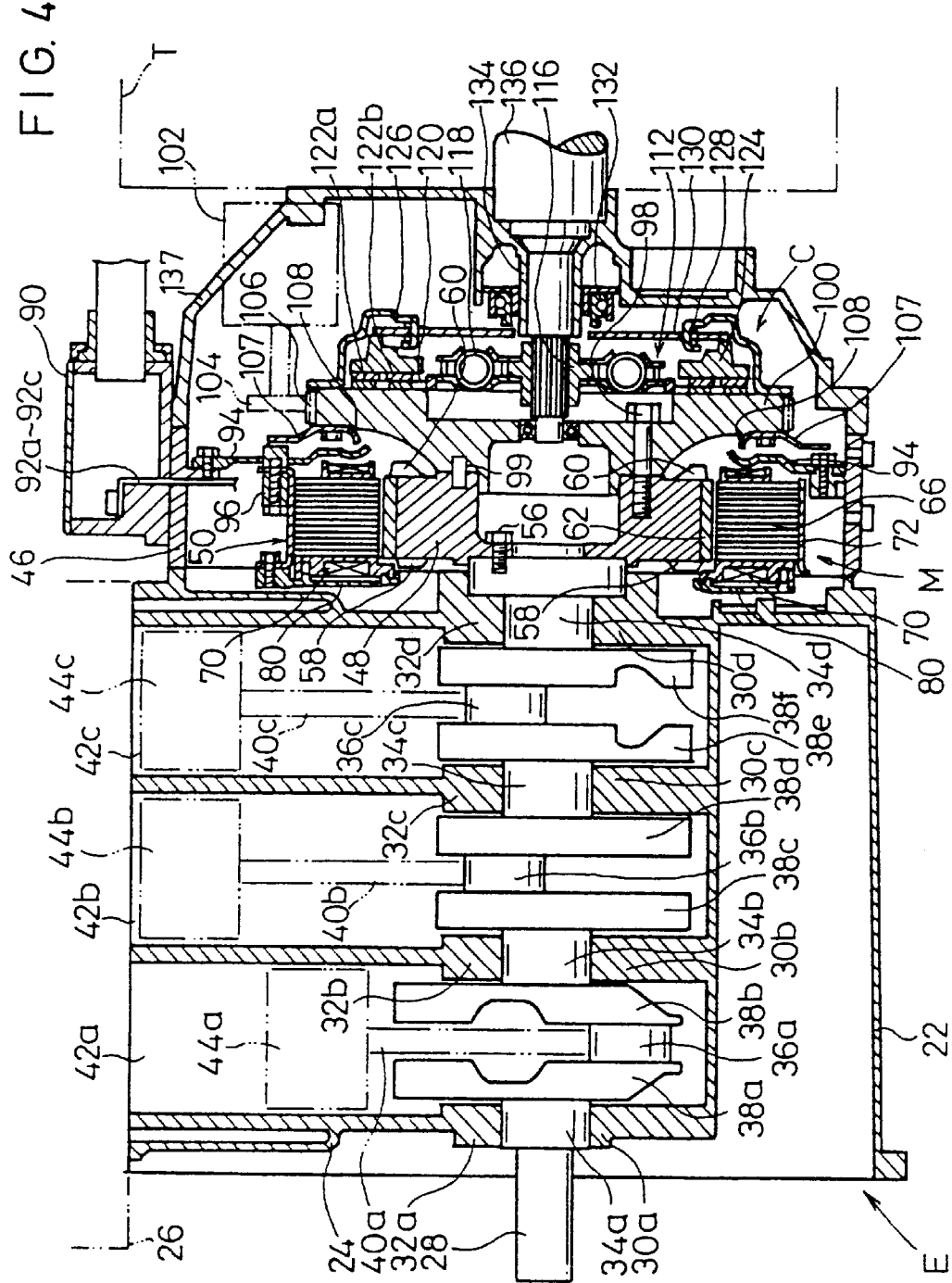
FIG. 4 is a vertical cross-sectional view of the hybrid vehicle propulsion apparatus.

FIGS. 2 through 4 show the hybrid vehicle propulsion apparatus which is designed for use on a manual-transmission hybrid vehicle. The internal combustion engine E, which is a three-cylinder engine, comprises an oil pan 22, a cylinder block 24, and a cylinder head 26 with a head cover 27 mounted on the top thereof. The oil pan 22 and the cylinder block 24 are joined to each other through a plurality of journal bearings 30a–30d, 32a–32d of a crankshaft 28. The crankshaft 28 comprises a plurality of journals 34a–34d, a plurality of crankpins 36a–36c, and a plurality of counterweights 38a–38f. The journals 34a–34d are rotatably supported by the journal bearings 30a–30d, 32a–32d. Connecting rods 40a–40c have respective ends operatively coupled to the crankpins 36a–36c, respectively. Pistons 44a–44c are connected to respective other ends of the connecting rods 40a–40c for sliding displacement in and along cylinders 42a–42d that are defined in the cylinder block 24.

The motor generator M and the clutch mechanism C are accommodated in a housing 46 which is joined to an end of the internal combustion engine E.

Figure 5:
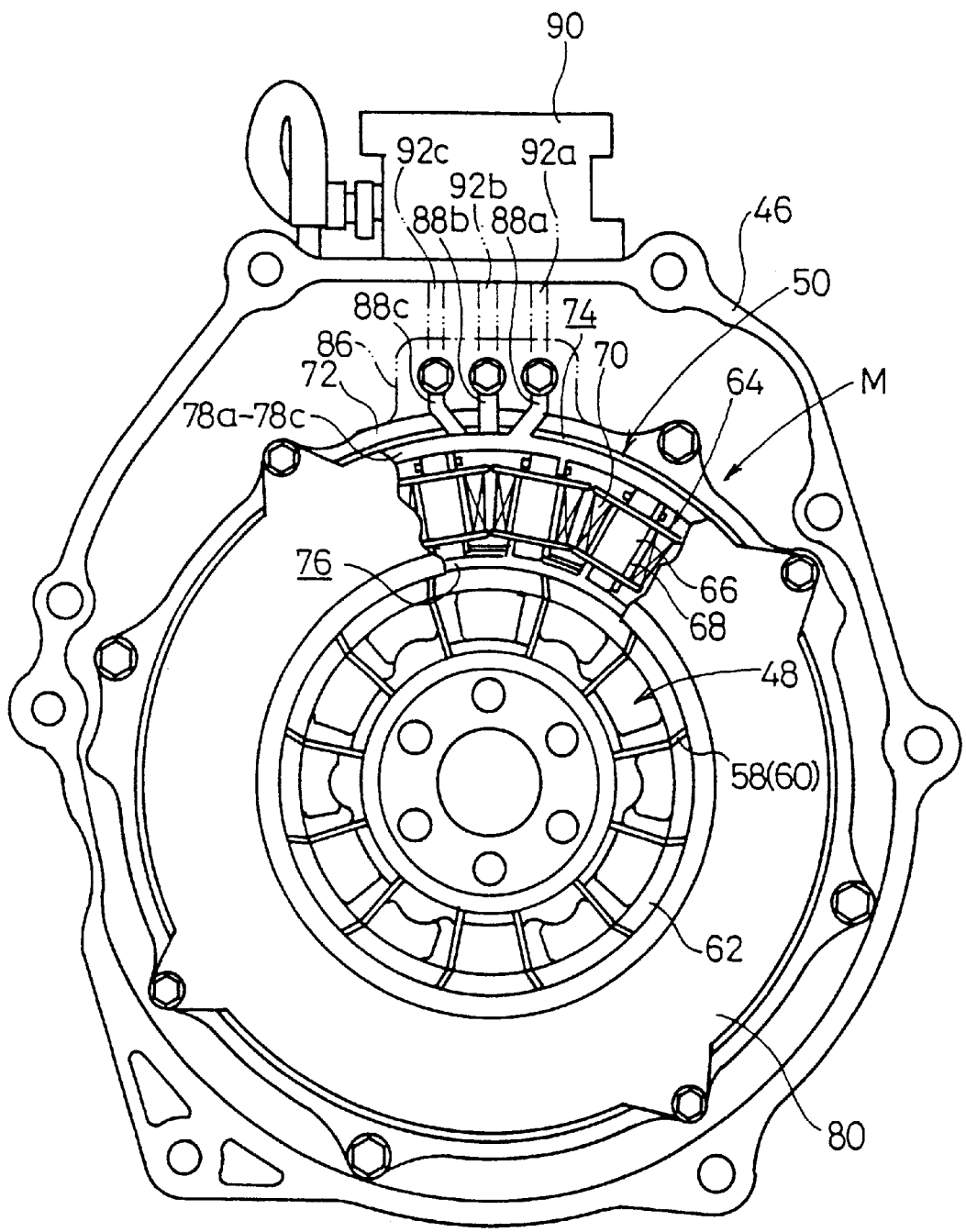
FIG. 5 is an elevational view, partly cut away, of an end of an internal combustion engine as viewed from a motor generator of the hybrid vehicle propulsion apparatus.
Figure 6:
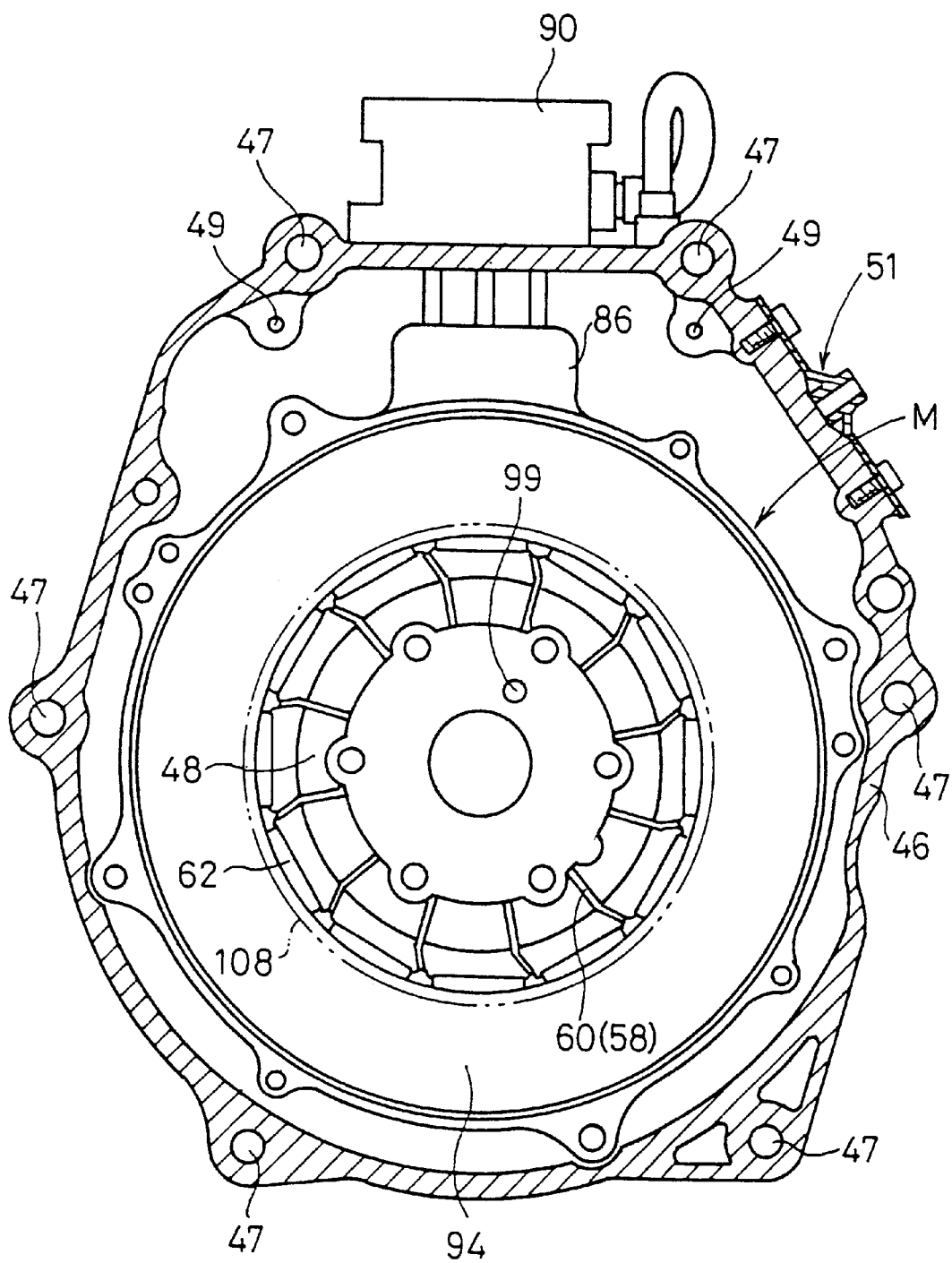
FIG. 6 is an elevational view of an end of the motor generator as viewed from a transmission of the hybrid vehicle propulsion apparatus.

FIG. 5 shows an end of the internal combustion engine E as viewed from the motor generator M. FIG. 6 shows an end of the motor generator M as viewed from the transmission T. The housing 46 has a plurality of attachment holes 47 defined in its outer circumference for passage therethrough of mounting bolts for fastening the housing 46 to the internal combustion engine E, and a plurality of holes 49 defined in its outer circumference for passage therethrough of knock pins for positioning the housing 46 and the internal combustion engine E with respect to each other.

The motor generator M comprises a circular rotor 48 and a doughnut-shaped stator 50 disposed around the circular rotor 48. As shown in FIG. 4, the rotor 48 is directly fixed to an end of the crankshaft 28 by a bolt 56. The rotor 48 has a plurality of fins 58, 60 on its opposite end faces, and a plurality of magnets 62, serving as alternate N and S poles, disposed on an outer circumferential surface thereof.

The stator 50 comprises a circular array of coil units 64 (see FIG. 5) each comprising a coil 70 wound around a core 66 made of a plurality of laminated metal sheets and guided by a cross-sectionally channel-shaped guide 68. The stator 50 is fixed to the end surface of the internal combustion engine E by an attachment 72 disposed around the coil units 64.

Figure 7:
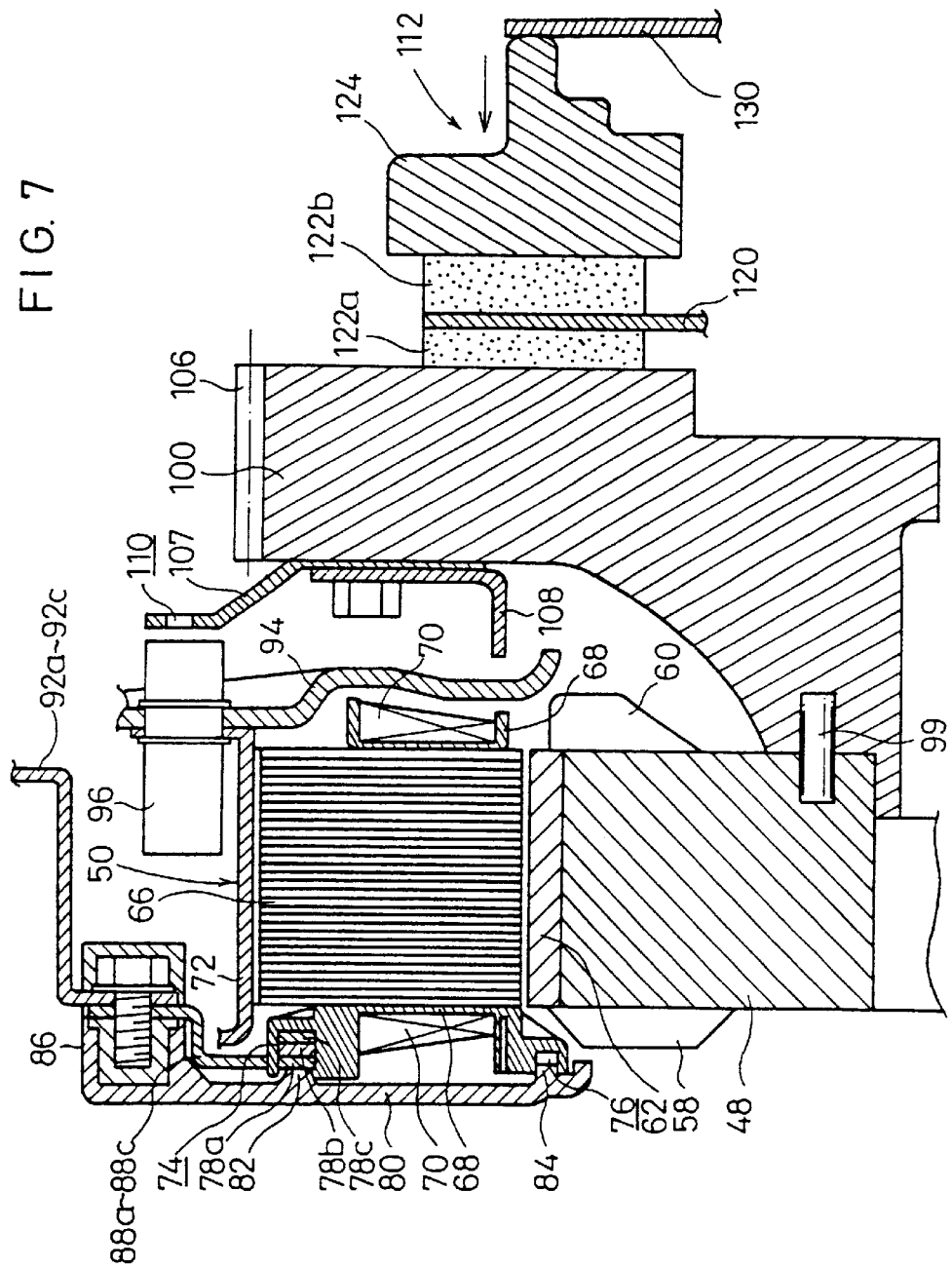
FIG. 7 is an enlarged fragmentary cross-sectional view of the motor generator and a clutch mechanism of the hybrid vehicle propulsion apparatus.

The guides 68 have circular grooves 74, 76 defined in radially outer and inner regions of the stator 50, as shown in FIG. 7. Three electrically conductive connection rings 78a, 78b, 78c are stacked and mounted in the groove 74. Each of the connection rings 78a, 78b, 78c has an insulating layer coated on its surface, and is connected to every third coil 70 for energizing the coils 70 with alternating currents in three phases.

A disk-shaped shield plate 80 is mounted on the end of the stator 50 which faces the internal combustion engine E for preventing magnetic leakage from the motor generator M to the internal combustion engine E. The shield plate 80 is fixed to an attachment 72 (see FIG. 5) and has ridges 82, 84 disposed on respective outer and inner circumferential portions thereof and engaging in the respective grooves 74, 76. The ridge 82 engaging in the groove 74 serves to press and position the connection rings 78a, 78b, 78c in the groove 74. The shield plate 80 has a connector 86 projecting radially outwardly and supporting three terminals 88a, 88b, 88c projecting radially outwardly from the respective connection rings 78a, 78b, 78c. The terminals 88a, 88b, 88c are connected to respective terminals 92a, 92b, 92c extending from a connector 90 (see FIG. 4) mounted on the housing 40.

If the shield plate 80 is to serve as an electrically insulating plate, then it may be made of a synthetic resin or SUS (stainless steel) coated with an insulating layer of synthetic resin, fluorine or the like. If the shield plate 80 is to serve as a magnetically insulating plate, then it may be made of a metallic material.

Figure 8:
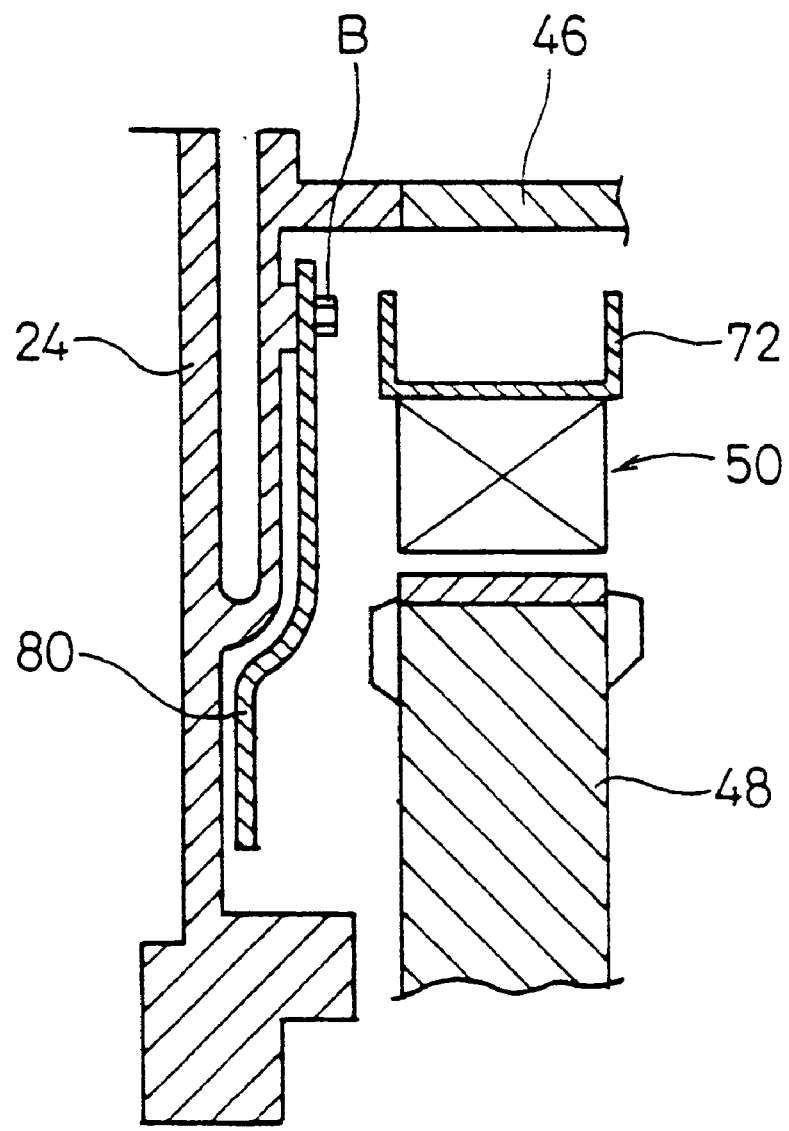
FIG. 8 is an enlarged fragmentary cross-sectional view of another shield plate.
Figure 9:
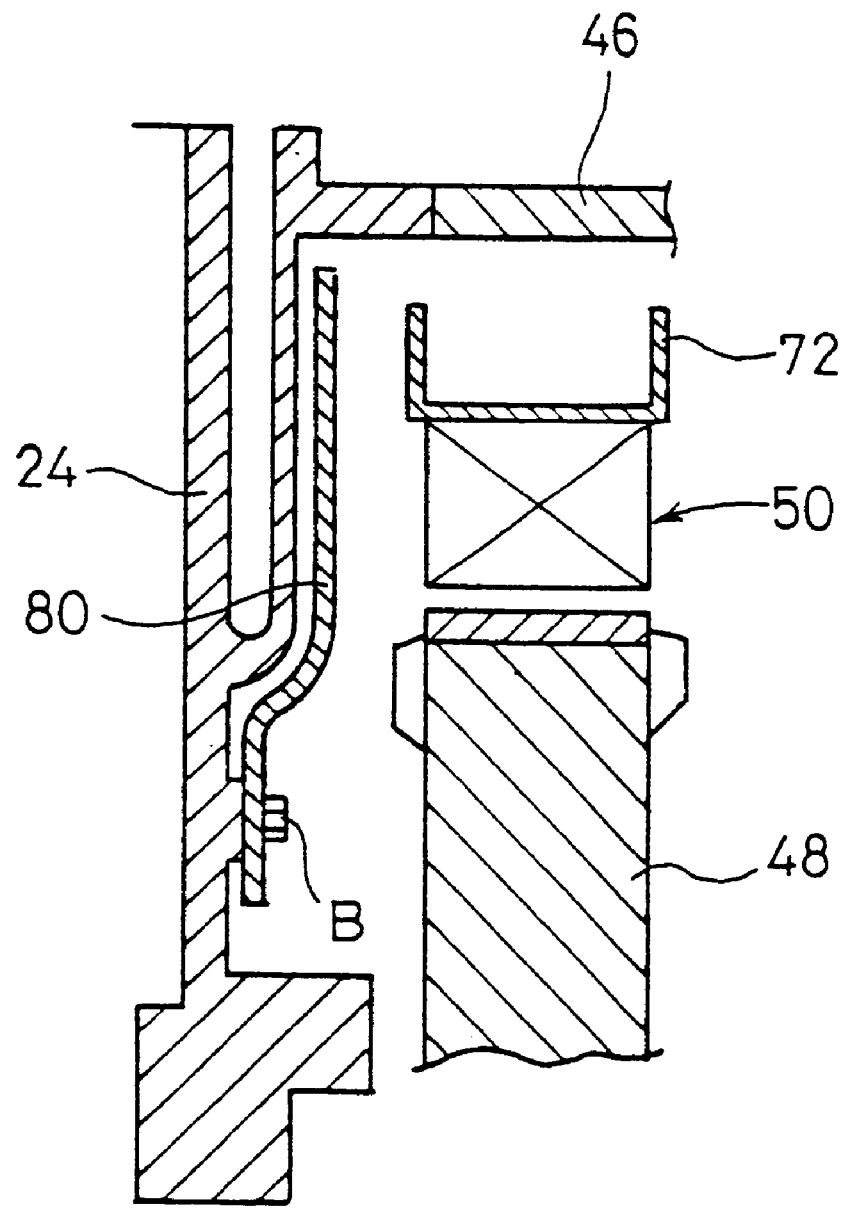
FIG. 9 is an enlarged fragmentary cross-sectional view of still another shield plate.
Figure 10:
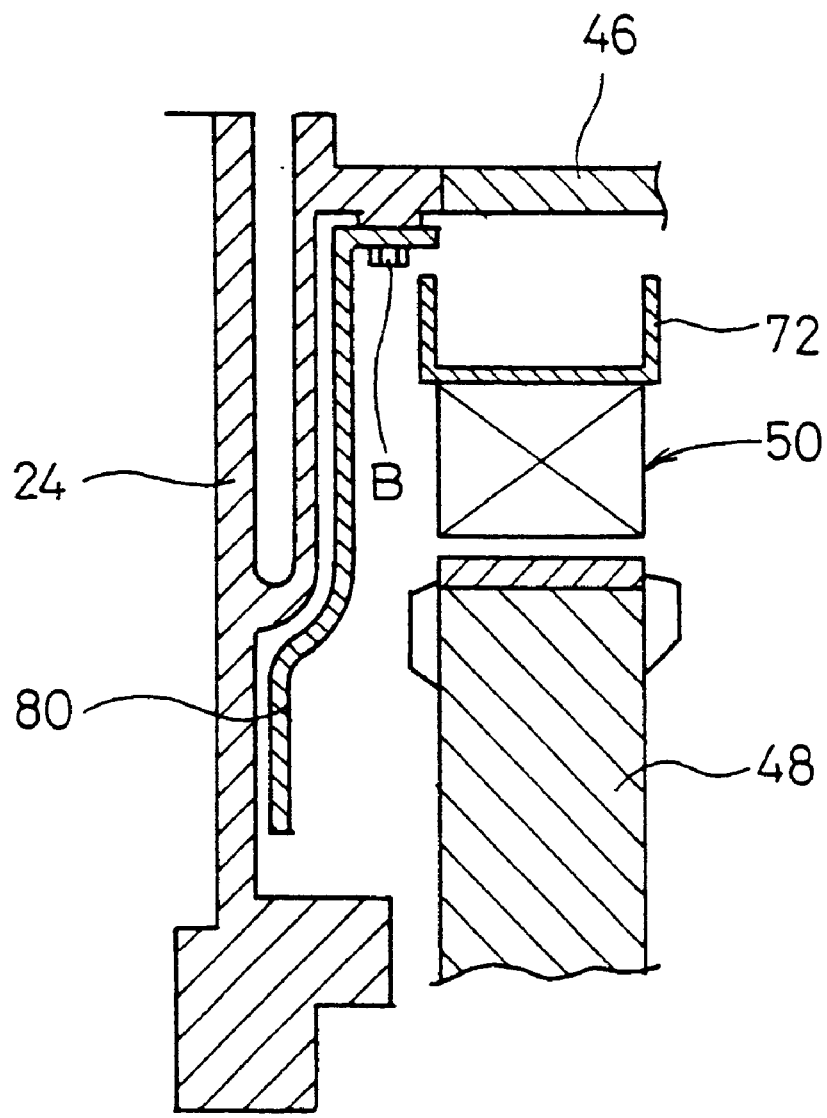
FIG. 10 is an enlarged fragmentary cross-sectional view of yet still another shield plate.

The shield plate 80 may be fastened at its radially outer edge to the cylinder block 24 by mounting bolts B, as shown in FIG. 8, or may be fastened at its radially inner edge to the cylinder block 24 by mounting bolts B, as shown in FIG. 9. Further alternatively, as shown in FIG. 10, the shield plate 80 may have its radially outer edge bent axially toward the housing 46 and fastened to the cylinder block 24 by mounting bolts B. According to still another alternative, the shield plate 80 may be fastened to the rotor 48, rather than the stator 50.

A first doughnut-shaped partition 94 fixed to the housing 46 is disposed on a side of the stator 50 which faces the transmission T. The first partition 94 serves as a shield and has a radially inner region curved toward the transmission T. The first partition 94 supports a position sensor 96 for detecting the angular position of the rotor 48 with respect to the stator 50. A signal wire from the position sensor 96 extends out of the housing 46 through a wire outlet hole 51 (see FIG. 6) defined in the housing 46.

A disk-shaped flywheel 100 is positioned with respect to the rotor 48 by a positioning pin 99 and fastened to the rotor 48 by a bolt 98 (see FIG. 4) oriented from the transmission T toward the motor generator M. The flywheel 100 has a ring gear 106 on an outer circumferential edge thereof which is held in mesh with a drive gear 104 of the stator motor 102. As shown in FIG. 7, a drive plate 107 and a second doughnut-shaped partition 108 are fixed to a surface of the flywheel 100 which faces the motor generator M. The second partition 108 has a radially inner region curved toward the first partition 94 and radially overlapping the first partition 94. The starter motor 102 is mounted on an outer surface of a transmission case 137 of the transmission T by mounting bolts B (see FIG. 3).

Each of the first and second partitions 94, 108 may comprise a synthetic resin plate or a thin SP plate (iron plate), or an SP plate coated with a layer of synthetic resin.

The drive plate 107 has a hole (not shown) defined therein in radially aligned relation to the position sensor 96. The angular position of the drive plate 107 which rotates with the rotor 48 can be detected by the position sensor 96 which detects the hole in the drive plate 107. The magnets 62 on the rotor 48 and the hole in the drive plate 107 are positioned relatively to each other by the positioning pin 99 which engages both the rotor 48 and the flywheel 100.

The clutch mechanism C has a friction disk 112 mounted on a surface of the flywheel 100 which faces the transmission T. The friction disk 112 comprises a boss 116 with splines on its inner circumferential surface, a plate 120 extending radially outwardly of the boss 116 through torsion springs 118, and friction plates 122a, 122b joined to respective opposite surfaces of the plate 120.

A pressure plate 124 is positioned on the friction plate 122b of the friction disk 112. A diaphragm spring 130 is held by a wire spring 128 on a housing 126 fixed to the flywheel 100. The diaphragm spring 130 has an outer circumferential region disposed on one side of the pressure plate 124 which faces the transmission T. A piston 132 is disposed on one side of an inner outer circumferential region of the diaphragm spring 130 which faces the transmission T. The piston 132 is disposed around a boss 134 on a transmission case 137 which is positioned coaxially with the boss 116 of the friction disk 112. The piston 132 can be displaced along the boss 134 by a hydraulic mechanism (not shown) to press the diaphragm spring 130. The transmission T has a shaft 136 extending through the bosses 134, 116 and having an end engaging the splines of the boss 116.

Operation and advantages of the hybrid vehicle propulsion apparatus thus constructed will be described below.

It is assumed that the hybrid vehicle V is propelled by the internal combustion engine E. When the starter motor 102 is energized, the flywheel 100 is rotated by the drive gear 104 and the ring gear 106, rotating the rotor 48 to crank the internal combustion engine E. Gasoline is supplied from the cylinder head 26 into the cylinders 42a, 42b, 42c and ignited in the cylinders 42a, 42b, 42c to displace the pistons 44a, 44b, 44c in the respective cylinders 42a, 42b, 42c for thereby rotating the crankshaft 28. When rotated, the crankshaft 28 rotates the rotor 48 of the motor generator M and the flywheel 100.

The driver of the hybrid vehicle V selects a suitable gear position with the transmission T and makes an action to engage the clutch mechanism C. The piston 132 of the clutch mechanism C is displaced in a direction away from the diaphragm spring 130. The diaphragm spring 130 is displaced to follow the piston 132, causing the outer circumferential edge thereof to press the pressure plate 124. As a result, the friction plates 122a, 122b of the friction disk 112 is sandwiched between the pressure plate 124 and the flywheel 100, whereupon the transmission T and the internal combustion engine E are connected to each other through the rotor 48 of the motor generator M.

When the internal combustion engine E and the transmission T are connected to each other by the clutch mechanism C, propulsive forces from the internal combustion engine E are transmitted from the internal combustion engine E through the transmission T to the drive axle 10 (see FIG. 1), thereby propelling the hybrid vehicle V. Because the rotor 48 of the motor generator M which is relatively heavy is directly coupled to the crankshaft 28, a relatively smooth and stable rotational power flow is transmitted from the internal combustion engine E to the transmission T.

It is now assumed that the hybrid vehicle V is propelled by the motor generator M. The first energy storage unit 13 stores electric energy which has been generated in a regenerative mode by the motor generator M when the internal combustion engine E is decelerated or idles. When the electric energy stored in the first energy storage unit 13 is supplied through the motor drive circuit 12 to the coils 70 of the motor generator M, the coils 70 generates a magnetic field to rotate the rotor 48 and the flywheel 100. The rotation of the flywheel 100 is transmitted as propulsive forces through the clutch mechanism C and the transmission T to the drive axle 10, thereby propelling the hybrid vehicle V. The propulsive forces from the motor generator M can be generated as assistive forces for propulsive forces from the internal combustion engine E at the same time the propulsive forces are produced by the internal combustion engine E.

When the driver makes an action to disengages the clutch mechanism C, the piston 132 is displaced toward the internal combustion engine E, moving the outer circumferential edge of the diaphragm spring 130 away from the pressure plate 124. The friction plates 122a, 122b are released from the gripping action by the pressure plate 124 and the flywheel 100, thus disconnecting the internal combustion engine E or the motor generator M from the transmission T.

When currents and magnetic fluxes leak from the coils 70 toward the internal combustion engine E at the time the coils 70 are energized, since the cylinder block 24 is made of metal, the currents from the coils 70 would tend to flow in the cylinder block 24 and the magnetic fluxes from the coils 70 would tend to magnetize the cylinder block 24, thereby adversely affecting the operation of the pistons 44a–44c.

According to the illustrated embodiment, the shield plate 80 disposed between the internal combustion engine E and the motor generator M is effective to block the currents and the magnetic fluxes from the coils 70 against leakage toward the internal combustion engine E. Therefore, the pistons 44a–44c will not be adversely affected by the current leakage from the coils 70 and will not be magnetized by the magnetic flux leakage from the coils 70, so that the operation of the pistons 44a–44c will not suffer trouble. As a result, the operation of the internal combustion engine E will not be adversely affected. Because the motor generator M can be positioned closely to the internal combustion engine E, the crankshaft 28 can rotate smoothly and stably, the motor generator M can be of increased rigidity, and the hybrid vehicle propulsion apparatus can be compact as a whole.

The first partition 94 is positioned as a shield between the motor generator M and the flywheel 100. Therefore, no current and magnetic flux leakage occurs from the coils 70 toward the flywheel 100. Therefore, the flywheel 100 will rotate smoothly without trouble.

In the illustrated embodiment, the motor generator M, the flywheel 100, and the transmission T are successively connected to the internal combustion engine E. Since the structure by which the clutch mechanism C is attached to the flywheel 100 is not limited by the motor generator M, it is possible to employ a conventional attachment structure for the successive connection of the motor generator M, the flywheel 100, and the transmission T.

The first partition 94 also serves as a blocking member for blocking metal particles produced by the friction plates 122a, 122b of the friction disk 112 against entry into the motor generator M.

Specifically, with the internal combustion engine E or the motor generator M connected to the transmission T by the clutch mechanism C, metal particles produced by the friction plates 122a, 122b are first blocked by the second partition 108 whose radially inner region is curved toward the motor generator M and then by the first partition 94 whose radially inner region is curved toward the flywheel 100. Furthermore, an air flow caused by the fins 60 on one of the opposite end faces of the rotor 48 which is rotating is also effective to block metal particles against entry into the motor generator M. Consequently, the motor generator M is kept under good conditions without being affected by metal particles from the clutch mechanism C. The fins 58, 60 are also effective to dissipate heat from the motor generator M as well as to block metal particles against entry into the motor generator M.

Figure 11:
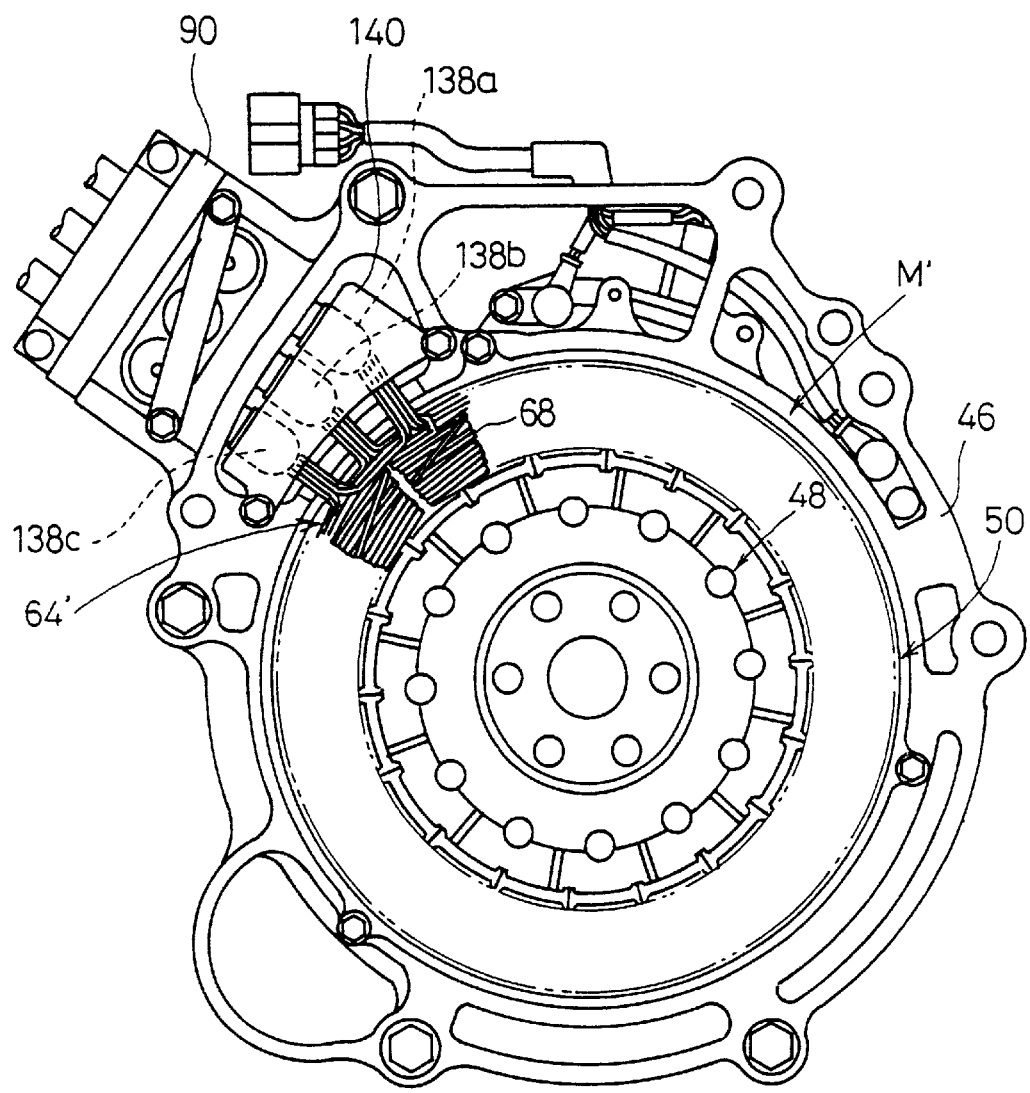
FIG. 11 is an elevational view, partly cut away, of an end of a motor generator as viewed from an internal combustion engine of a hybrid vehicle propulsion apparatus according to another embodiment of the present invention.

FIG. 11 shows a motor generator M' as viewed from an internal combustion engine of a hybrid vehicle propulsion apparatus according to another embodiment of the present invention. Those parts shown in FIG. 11 which are identical to those shown in FIG. 5 are denoted by identical reference characters, and will not be described in detail below.

The motor generator M' has coil units 48 whose coils 68 have coil ends connected directly to connectors 138a, 138b, 138c which are connected to the connector 90 mounted on the housing 46. An insulating plate 140 is attached to the end of the housing 46 which faces the internal combustion engine E, and covers the connectors 138a, 138b, 138c to insulate the connectors 138a, 138b, 138c where the coil ends of the coils 68 are exposed.

The first partition 94 and the second partition 108 are disposed between the motor generator M' and the clutch mechanism C for blocking metal particles from the clutch mechanism C against entry into the motor generator M'.

Figure 12:
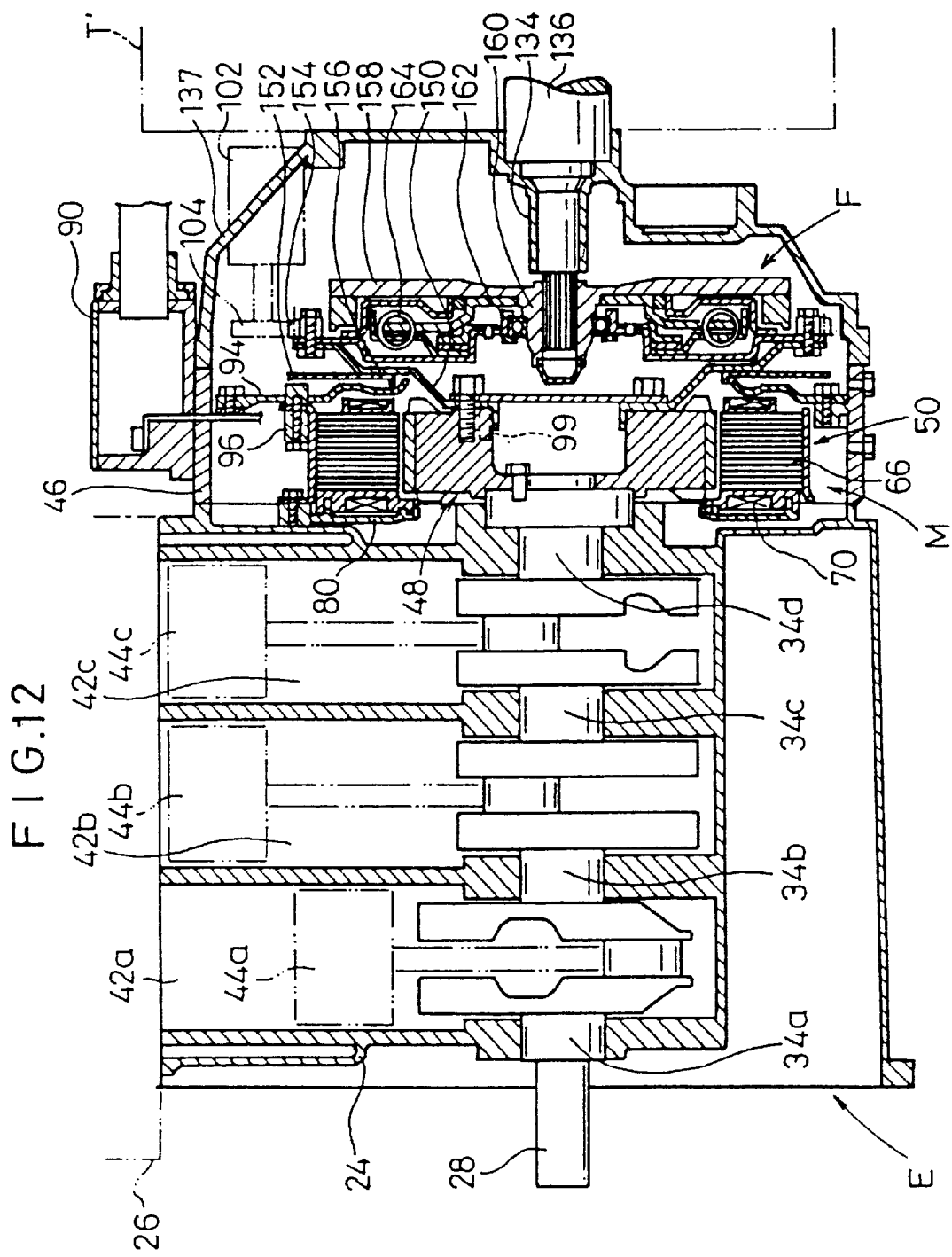
FIG. 12 is a vertical cross-sectional view of a hybrid vehicle propulsion apparatus according to still another embodiment of the present invention.

FIG. 12 shows a hybrid vehicle propulsion apparatus according to still another embodiment of the present invention. The hybrid vehicle propulsion apparatus is designed for use on an automatic-transmission hybrid vehicle. Those parts of the hybrid vehicle propulsion apparatus shown in FIG. 10 which are identical to those shown in FIG. 4 are denoted by identical reference characters, and will not be described in detail below.

A flywheel mechanism F is disposed between the motor generator M and an automatic transmission T'. The flywheel mechanism F is coupled to the rotor 48 of the motor generator M by a joint plate 150 on which a drive plate 152 is mounted. The flywheel mechanism F includes a primary flywheel 156 having a ring gear 154 on its outer circumferential edge and connected to the joint plate 150. The flywheel mechanism F also has a secondary flywheel 158 disposed parallel to the primary flywheel 156. The secondary flywheel 158 has a central boss 160 having splines engaged by the shaft 136 of the transmission T'. The primary flywheel 156 is supported on the boss 160 by a bearing 162, and is connected to the secondary flywheel 158 by torsion springs 164.

In operation, after the starter motor 102 has cranked the internal combustion engine E, the rotor 48 of the motor generator M rotates to rotate the primary flywheel 156. The rotation of the primary flywheel 156 is transmitted through the torsion springs 164 to the secondary flywheel 158, whose rotation is then transmitted through the shaft 136 to the transmission T'. Depending on the rotational speed of the shaft 136, the transmission T' actuates an automatic transmission mechanism (not shown) thereby to rotate the drive axle 10.

The shield plate 80 and the first partition 94 block currents and magnetic fluxes from the coils 70 of the motor generator M against entry into the internal combustion engine E and the flywheel mechanism F. Consequently, the cylinder block 24, the primary wheel 156, and the secondary wheel 158 are prevented from being subject to unwanted currents which would otherwise tend to flow therein, and also from being undesirably magnetized. As a result, the crankshaft 28 can rotate stably and smoothly.

Although certain preferred embodiments of the present invention have been shown and described in detail, it-should be understood that various changes and modifications may be made therein without departing from the scope of the appended claims.

What is claimed is:

1. A hybrid vehicle propulsion apparatus on a hybrid vehicle having a transmission and a drive axle coupled thereto, comprising:

an internal combustion engine for generating propulsive forces;

a motor generator for generating propulsive forces, said motor generator comprising a stator and a rotor;

a clutch mechanism comprising a friction clutch, said clutch mechanism and said motor generator being accommodated in a single housing, for selectively transmitting the propulsive forces from said internal combustion engine or said motor generator to the transmission; and blocking means fixed to said rotor, for blocking an abrasive powder produced by said clutch mechanism against entry into said motor generator, wherein said clutch mechanism is disposed between the blocking means and the transmission.

2. A hybrid vehicle propulsion apparatus according to claim 1, wherein said rotor has fins on a surface thereof which faces said blocking means.

3. A hybrid vehicle propulsion apparatus on a hybrid vehicle having a transmission and a drive axle coupled thereto, comprising:

an internal combustion engine for generating propulsive forces;

a motor generator for generating propulsive forces;

a clutch mechanism comprising a friction clutch, said clutch mechanism being disposed between said motor generator and said transmission, for selectively transmitting the propulsive forces from said internal combustion engine and said motor generator to the transmission; and blocking means disposed between said motor generator and said clutch mechanism, for blocking an abrasive powder produced by said clutch mechanism against entry into said motor generator, wherein said motor generator has a stator and a rotor, said blocking means comprising:
a first partition fixed to said stator;
a second partition fixed to said rotor;
said first partition and said second partition overlapping each other.

4. A hybrid vehicle propulsion apparatus according to claim 3, further comprising a flywheel coupled to said rotor, said second partition being fixed to said flywheel.

* * * * *